Jan. 17, 1928.  
E. B. BREITKRENTZ  
VEGETABLE CUTTER  
Filed April 17, 1926

1,656,415

Inventor  
Emma B. Breitkrentz  
By  
Attorney

Patented Jan. 17, 1928.

1,656,415

UNITED STATES PATENT OFFICE.

EMMA B. BREITKRENTZ, OF HENDERSON, MINNESOTA.

VEGETABLE CUTTER.

Application filed April 17, 1926. Serial No. 102,617.

The present invention relates to a vegetable cutting or chopping device.

In the preparation of vegetables and fruits for cooking, or for use in salads, it is desirable to cut them into pieces of different shapes and sizes according to the purpose for which they are to be used.

An object of the present invention is to make a vegetable cutter having a frame with removable blades positioned therein at right angles to each other, said frame being slidably mounted to permit vertical movement of the knives, a recessed block being provided in the path of the knives to support articles thereon for cutting.

In order to attain this object there is provided, in accordance with one feature of the invention, a supporting base having four upright rods upon which is slidably mounted a frame having handles thereon by means of which it may be manipulated; and having blades removably positioned in said frame, some of the blades running longitudinally of the frame and other of said blades running transversely thereof and interlockingly engaging said longitudinal blades. Upon the base is removably mounted a supporting block having recesses therein to receive the blades on an operative stroke of the device, to insure a clean cut, entirely through an article placed upon the block for cutting.

These and other features of the invention, not specifically mentioned, will be more fully brought out in the following description and the accompanying drawings, wherein.

Figure 1:
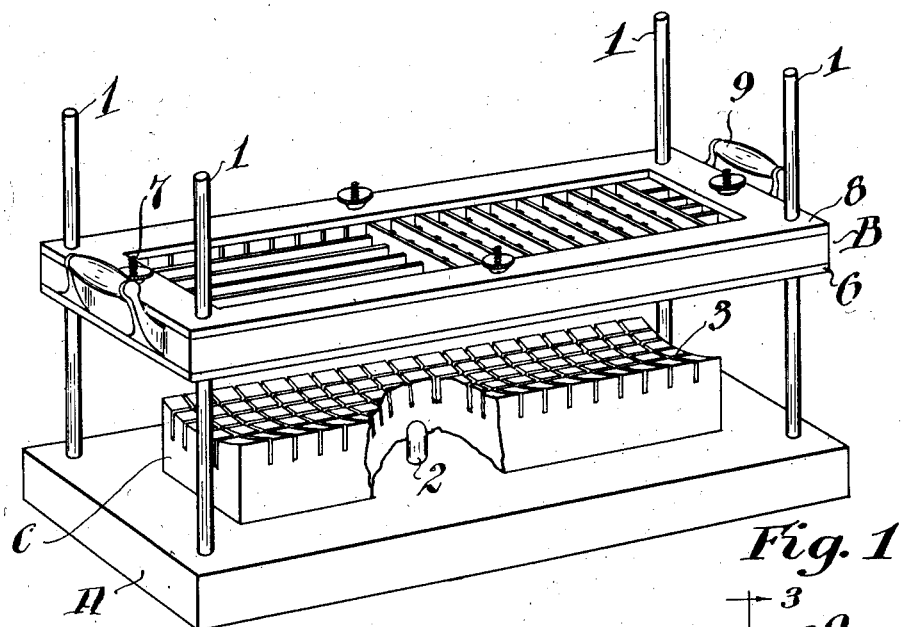
Figure 1 is a view in perspective of a vegetable cutting device made in accordance with the present invention.

Referring to the drawings in detail, a base A may be of wood, having four vertical rods 1 securely mounted thereon, to slidably mount a frame B carrying cutting blades removably mounted therein. A block C for supporting articles to be cut is removably positioned on the base as by means of dowels 2, the upper surface of the block being concave to retain the articles chopped thereon. Grooves 3 are cut longitudinally and transversely of the block, the grooves being spaced to receive the cutting blades during operation of the device. The cutter frame B comprises mainly a rectangular frame member 4 which may be of cast metal, such as aluminum, having slots 5 in the interior face thereof. A bottom plate 6 is securely fastened to the lower surface of said frame as by means of bolts 7 to support the cutting blades thereon. An upper plate 8, similar in size and shape to the lower plate, is removably secured to the top surface of the main frame 4 by means of the bolts 7 which hold the bottom plate. Handles 9 are securely fastened to each end of the main frame to provide means whereby the frame can be manipulated for chopping. A small frame D, similar in construction to the frame B, but smaller, may be removably mounted on the frame B and is useful in chopping and slicing of small fruits and vegetables, or eggs for salads. The small frame may use the same transverse blades as the main frame, while the longitudinal blades therefor, though similar in construction to those of the main frame, are shorter.

Figures 2, 3, 4, 7:
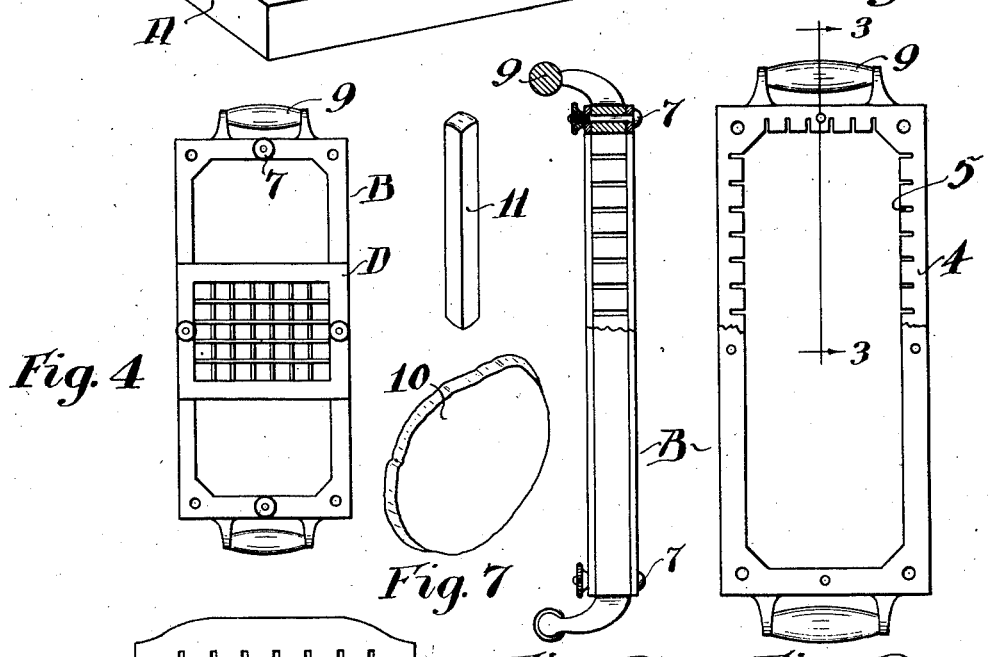
Figure 2 is a view in top elevation of a knife supporting frame, a knife retaining plate being removed therefrom.
Figure 3 is a view, partly in elevation and partly in section, on the line 3—3 of the device shown in Figure 2, a blade retaining plate being shown in position thereon.
Figure 4 is a view in top elevation of a knife supporting frame having a small auxiliary cutting device removably mounted thereon.
Figure 7 is a view in perspective of a square strip and a slice, respectively, of vegetable cut by the device.
Figure 5:
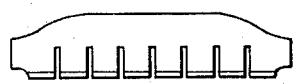
Figure 5 is a view in side elevation of one of the transverse cutting blades.
Figure 6:
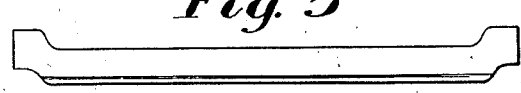
Figure 6 is a view, also in side elevation, of one of the longitudinal cutting blades.

When it is desired to slice articles with the device, the longitudinal blades only are employed, as in the left hand portion of the device shown in Figure 1. A slice 10 cut in this manner is shown in Figure 7. A square strip 11 is also shown in Figure 7. Such a strip would be produced by the cutting blades as mounted in the right hand portion of the device, shown in Figure 1, or by the blades of the auxiliary frame D in Figure 4. To produce cubes the articles would be first cut into strips 11 and these strips positioned at right angles to the cutting blades and again cut. This could best be done by arranging the blades as shown in Figure 1. The article would first be placed on the right hand side of the block and cut into strips such as 11 and these strips would then be placed on the left hand side of the block, crosswise thereof, and again cut, the second cut dividing the rectangular strips into cubes. Other applications of the device will be apparent to the user, its compactness and ease of adjustment making it adaptable to a number of uses.

I claim:

A vegetable cutter, comprising a base, vertical guide means carried thereby, a blade holding frame slidably mounted on said vertical guide means, said frame comprising a rectangular frame member having blade receiving grooves in the sides and end thereof, blade retaining top and bottom members to cover the lower and upper ends of said grooves, respectively, means for removably fastening said blade retaining members in position thereon, and a plurality of transverse and longtudinal blades having the ends thereof shaped to fit within said blade holding grooves, one of said sets of blades being offset to extend substantially below the level of the blade receiving grooves in said frame, and the other of said sets of blades having the upper side thereof offset upwardly above the level of said grooves and the cutting edge thereof indented at intervals spaced to correspond with the spacing of the other of said sets of blades to receive said other blades therein and extend downwardly to substantially the cutting edge of the other of said blades when said blades are in position in said frame.

In testimony whereof I affix my signature.

EMMA B. BREITKRENTZ.